(12) United States Patent
Chuang et al.

(10) Patent No.: US 7,588,402 B2
(45) Date of Patent: Sep. 15, 2009

(54) FASTENER WITH REMOVABLE ELEMENT

(76) Inventors: Shu-Yun Chuang, No. 87-11, Sinmin Rd., Lijhu Township, Kaohsiung County 821 (TW); Yu-Sheng Tseng, No. 87-11, Sinmin Rd., Lijhu Township, Kaohsiung County 821 (TW)

( * ) Notice: Subject to any disclaimer, the term of this patent is extended or adjusted under 35 U.S.C. 154(b) by 0 days.

(21) Appl. No.: 12/052,241

(22) Filed: Mar. 20, 2008

(65) Prior Publication Data
US 2008/0166205 A1 Jul. 10, 2008

Related U.S. Application Data

(63) Continuation-in-part of application No. 11/513,075, filed on Aug. 31, 2006, now abandoned.

(51) Int. Cl.
*F16B 25/10* (2006.01)
(52) U.S. Cl. ................................ 411/387.1; 411/383
(58) Field of Classification Search ... 411/387.1–387.8, 411/383, 384
See application file for complete search history.

(56) References Cited

U.S. PATENT DOCUMENTS

| 4,022,099 | A | * | 5/1977 | Ballantyne | 411/383 |
| 4,900,207 | A | * | 2/1990 | McGovern | 411/383 |
| 5,234,300 | A | * | 8/1993 | Fluckiger | 411/383 |
| 5,785,476 | A | * | 7/1998 | McDonnell | 411/383 |

* cited by examiner

*Primary Examiner*—Gary Estremsky
(74) *Attorney, Agent, or Firm*—Rosenberg, Klein & Lee

(57) ABSTRACT

The present invention pertains to a screw with a removable tip section comprising a shank and a tip section; wherein the shank has a first threaded section consisted of an upper and a lower threaded sections and a recess defined at the surface of an end face. Furthermore, the tip section includes a second threaded section disposed thereon and an insertion having a coincident shape with the recess. By means of those threaded sections with different outer diameters, the screw is smoothly driven into the metal objects without being interfered in drilling and steadily fixed therein without swing after screwing; After screwing in, the tip section is alternatively removed from the shank by a wrench to be put into the recess to tighten or loosen the screw so as to increase the convenience of using.

4 Claims, 6 Drawing Sheets

FASTENER WITH REMOVABLE ELEMENT

CROSS-REFERENCE TO RELATED APPLICATION

This application is a continuation-in-part of the U.S. patent application Ser. No. 11/513,075, filed on Aug. 31, 2006, of which the subject matter is incorporated herein by reference in its entirety.

BACKGROUND OF THE INVENTION

1. Field of the Invention

The present invention relates to a fastener, in particular to a screw with removable element.

2. Description of the Related Art

A conventional screw 1 for screwing into metal objects is shown in FIG. 1 and generally includes a head 11, a shank 12 connecting thereto, a plurality of threads 13 defined around the shank 12, and a tip section 14 formed at the end of the shank 12. When the screw 1 is applied for screwing roofing objects, users used to climb on the roof and use a tool to rotate the head 11. The screw 1 is thus driven into the metal objects (not shown) by the tip section 14 and threads 13 to bore therethrough. However, the screw 1 may be facilely screwed in but hardly taken out of the surface of objects, namely users often need to climb on the roof and repeat the above operation for repairing the objects or loosening and tightening the screw, which makes burden and damages in operation.

Shown in FIG. 2, a screw 2 made for improving the above shortcomings includes a shank 21 and a tip section 22. The shank 21 fabricated of a stainless steel comprises a plurality of threads 211 spirally arranged thereon, a head 212 disposed at one end thereof, and a polygonal recess 213 at the other end. A tip section 22 made of another kind of harden metal respectively forms a drilling portion 221 and an insertion 222 at both ends thereof. Particularly, the tip section 22 can be removed from the shank 21 and repeatedly used after securing the objects to the roof, and users simply put a tool (not shown) into the recess 213 to reversely tighten or loosen the screw 2 without climbing on the roof very often.

As seen in FIG. 3, in practical, the insertion 222 is initially put into the recess 213, and then the tip section 22 forms a track 31 through the metal objects 3 while rotating the head 212; nevertheless, the shank 21 may not entirely follow the track 31 under the impediment of the diameter of threads 221, and which results in hesitating the movement of the screws 2 at the connection of the shank 21 and the tip section 22 and making the screw 2 unable to be substantially drilled into the objects 3. Threads 211 are facilely broken under the forced drilling although successfully screwing the screw 2 therein.

SUMMARY OF THE INVENTION

Therefore, the present invention intends to provide a screw with removable element which is conducive to substantially drive the screw into metal objects and increase the convenience of using.

The present invention relates to a screw comprising a shank and a tip section, wherein the shank includes a first threaded section consisting of threaded sections, and an insertion of the tip section has a coincident shape with a recess defined on the end face of the shank. Further the tip section has a second threaded section disposed thereon, an insertion, and a drilling portion. The above threaded sections respectively have different major diameters. In use, the drilling portion bores through the metal objects and provides guidance for the first threaded section to be gradually drilled into the hole from the threaded section with a smaller outer diameter toward the threaded section with a larger outer diameter, thereby assisting the screw to be firmly fixed therein without swing and preventing from damaging the first threaded section. Further, the insertion can be removed away and a wrench is used instead to loosen or tighten the screw, hence increasing the convenience of using.

The advantages of the present invention over the known prior arts will become more apparent to those of ordinary skilled in the art by reading the following descriptions with the relating drawings.

DETAILED DESCRIPTION OF THE PREFERRED EMBODIMENTS

Figure 1:
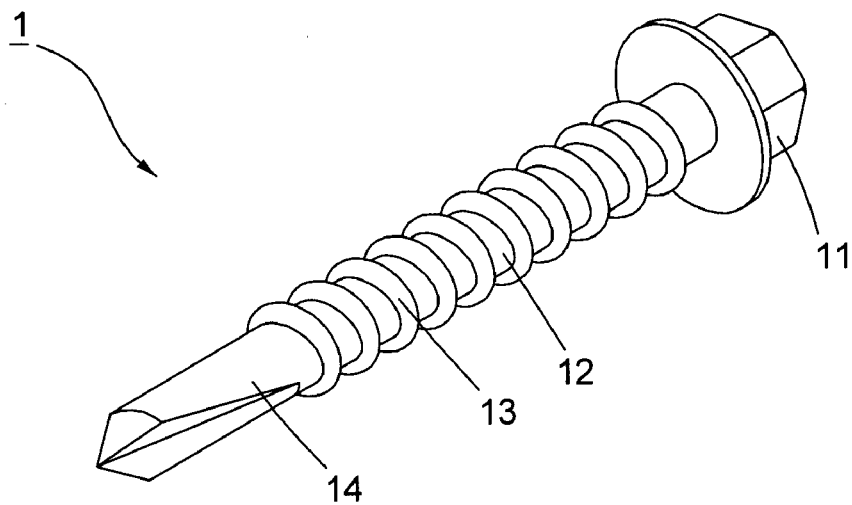
FIG. 1 is a perspective view showing a conventional screw.
Figure 2:
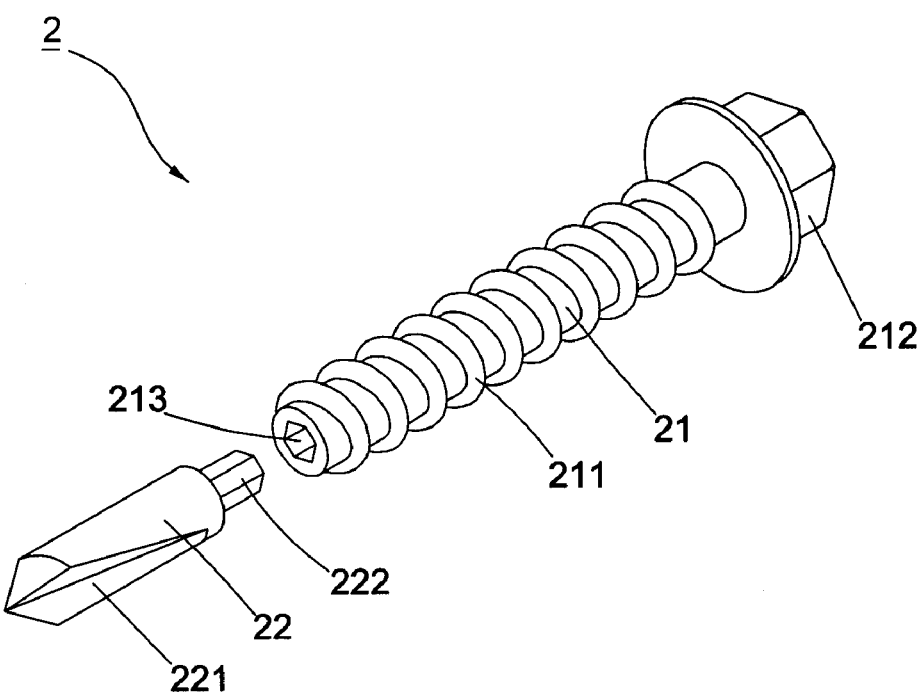
FIG. 2 is a perspective view showing another conventional screw.
Figure 3:
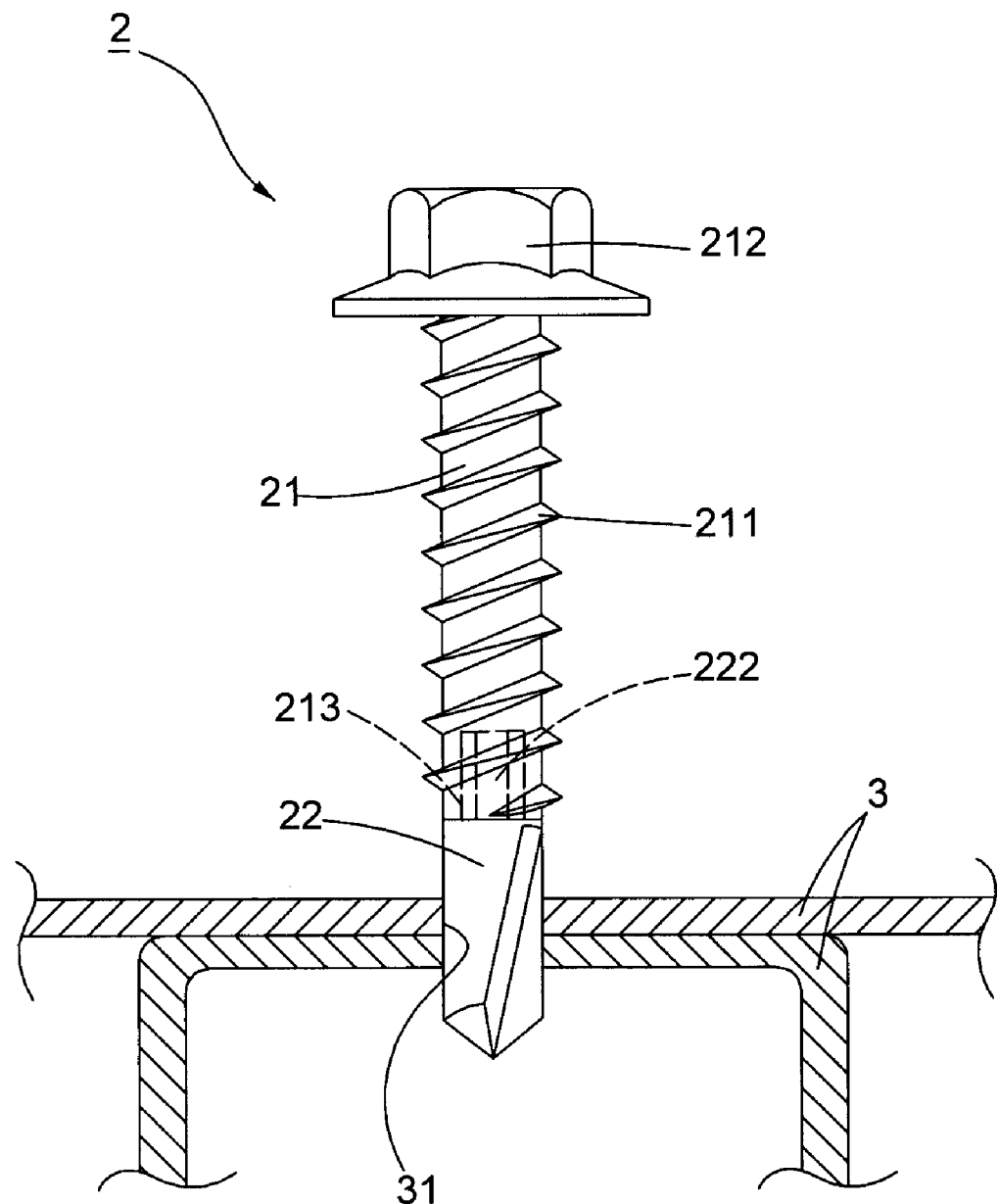
FIG. 3 is a schematic view showing the screw of FIG. 2 drilled into the metal objects.
Figure 4:
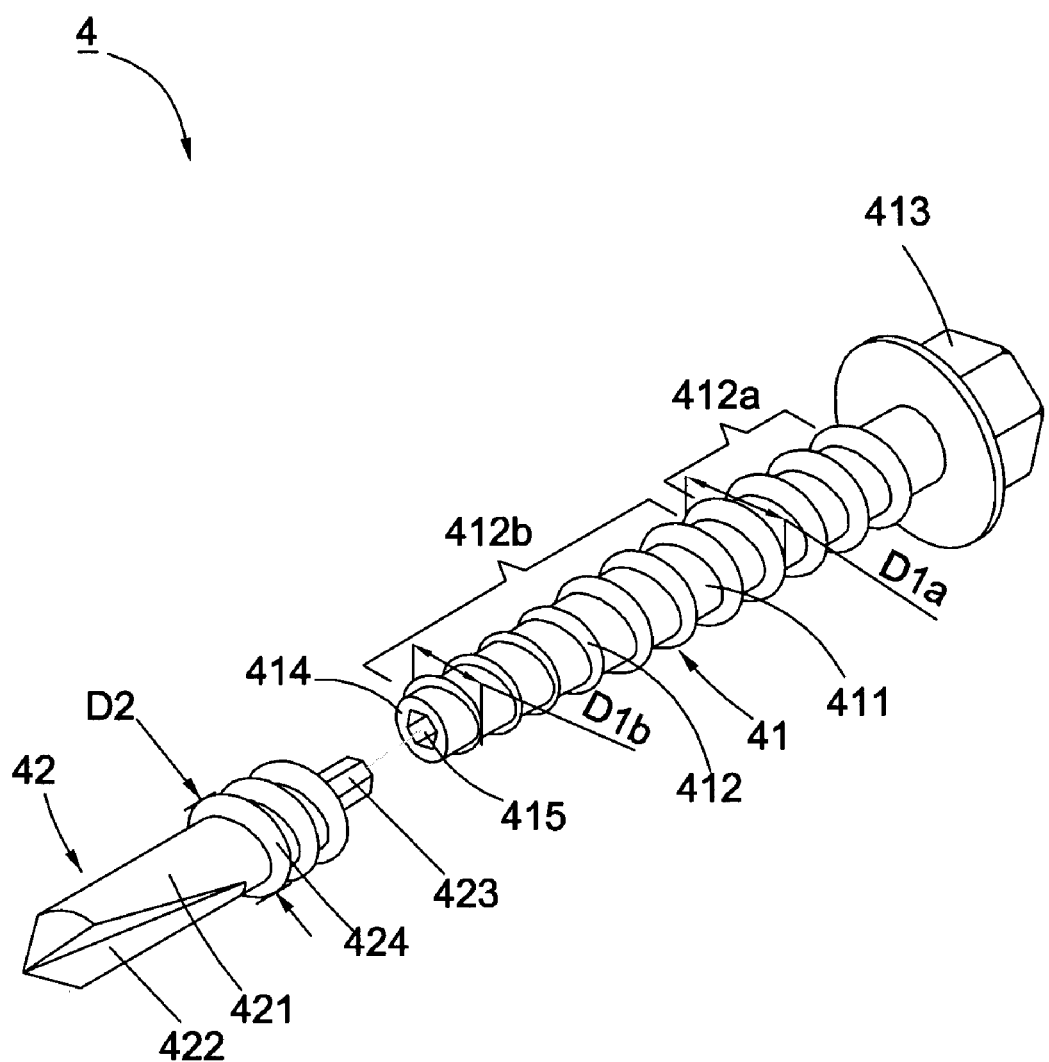
FIG. 4 is a perspective view showing a first preferred embodiment of the present invention.

Referring to FIG. 4, a fastener 4 ( e.g. screw 4) of a first preferred embodiment comprises a shank 41 and a tip section 42; the shank 41 made of a kind of metal material, for instance of a stainless steel, comprises a shank body 411, a first threaded section 412 extending around the shank body 411, a head 413 disposed at one end of the shank body 411, and an end face 414 disposed at the other end thereof, opposite to the head 413; wherein the first threaded section 412 includes an upper threaded section 412*a* located adjacent to the head 413 and a lower threaded section 412*b* located adjacent to the end face 414; further the end face 414 has a recess 415 defined on the surface thereof, and the recess 415 formed in a polygonal contour, e.g. a hexagonal shape, is applied to the preferred embodiments.

Figure 5:
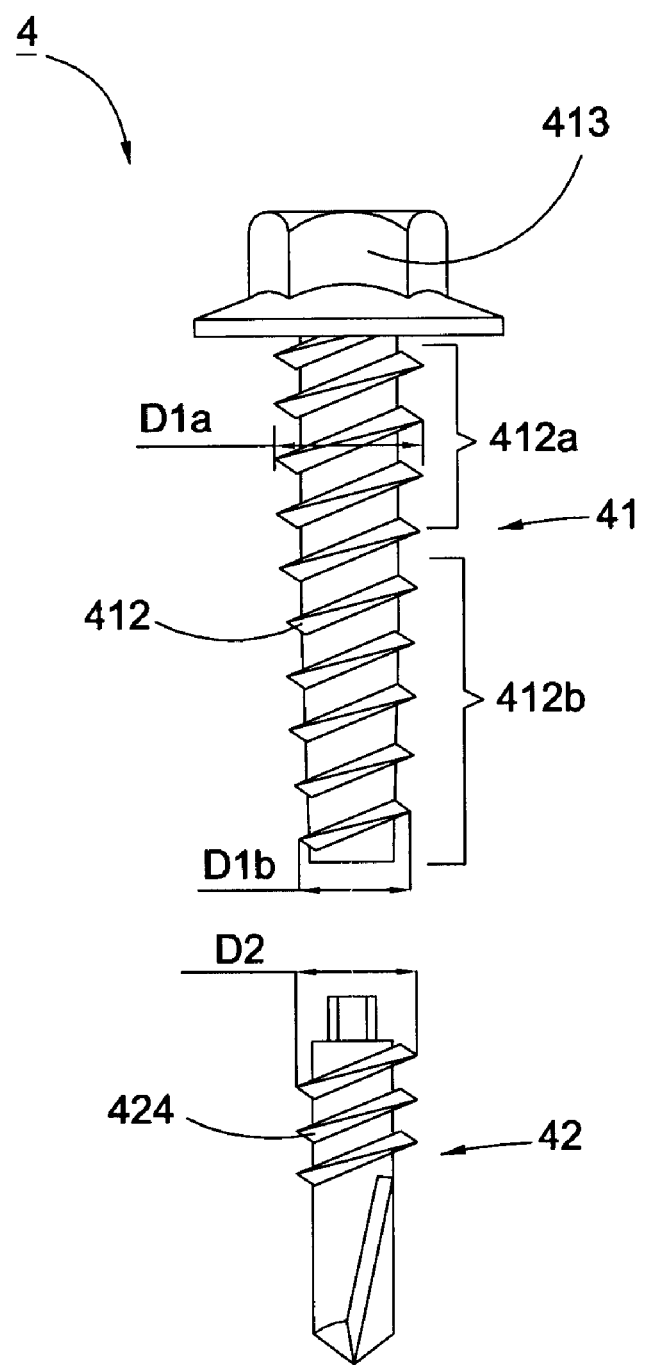
FIG. 5 is an elevation view showing the first preferred embodiment.
Figure 6:
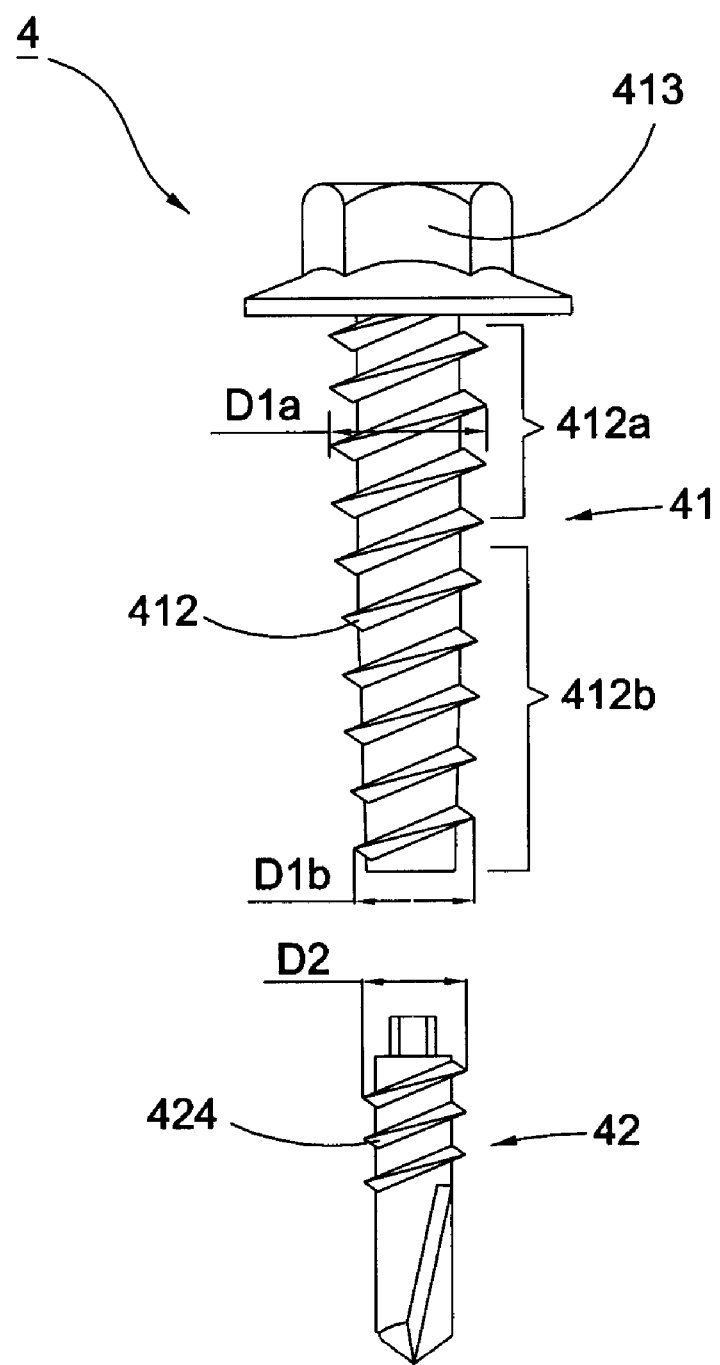
FIG. 6 is an elevation view showing a second preferred embodiment of the present invention.

Still further, the tip section 42 made of another kind of harden metal material includes a tip body 421, a drilling portion 422 disposed at one end thereof, an insertion 423 extending axially from the other end thereof, and a second threaded section 424 spiraled round the tip body 421 and located between the drilling portion 422 and the insertion 423. Wherein, the insertion 423 has a polygonal contour and herein a hexagonal pillar is adopted so that the insertion 423 accurately fits with the recess 415. In addition, the above threaded sections 412*a*, 412*b*, 424 have the same pitches; further, an outer diameter "D1*a*" of the upper threaded section 412*a* is greater than an outer diameter "D1*b*" of the lower threaded section 412*b* and an outer diameter "D2" of the second threaded section 424, and the outer diameter "D2" can be larger (shown in FIG. 5) or be smaller (shown in FIG. 6) than the outer diameter "D1*b*". Here it is adopted in the FIG. 7 that the outer diameter "D1*a*" is greater than the diameter "D2" and the diameter "D2" is greater than the diameter "D1*b*".

Figure 7:
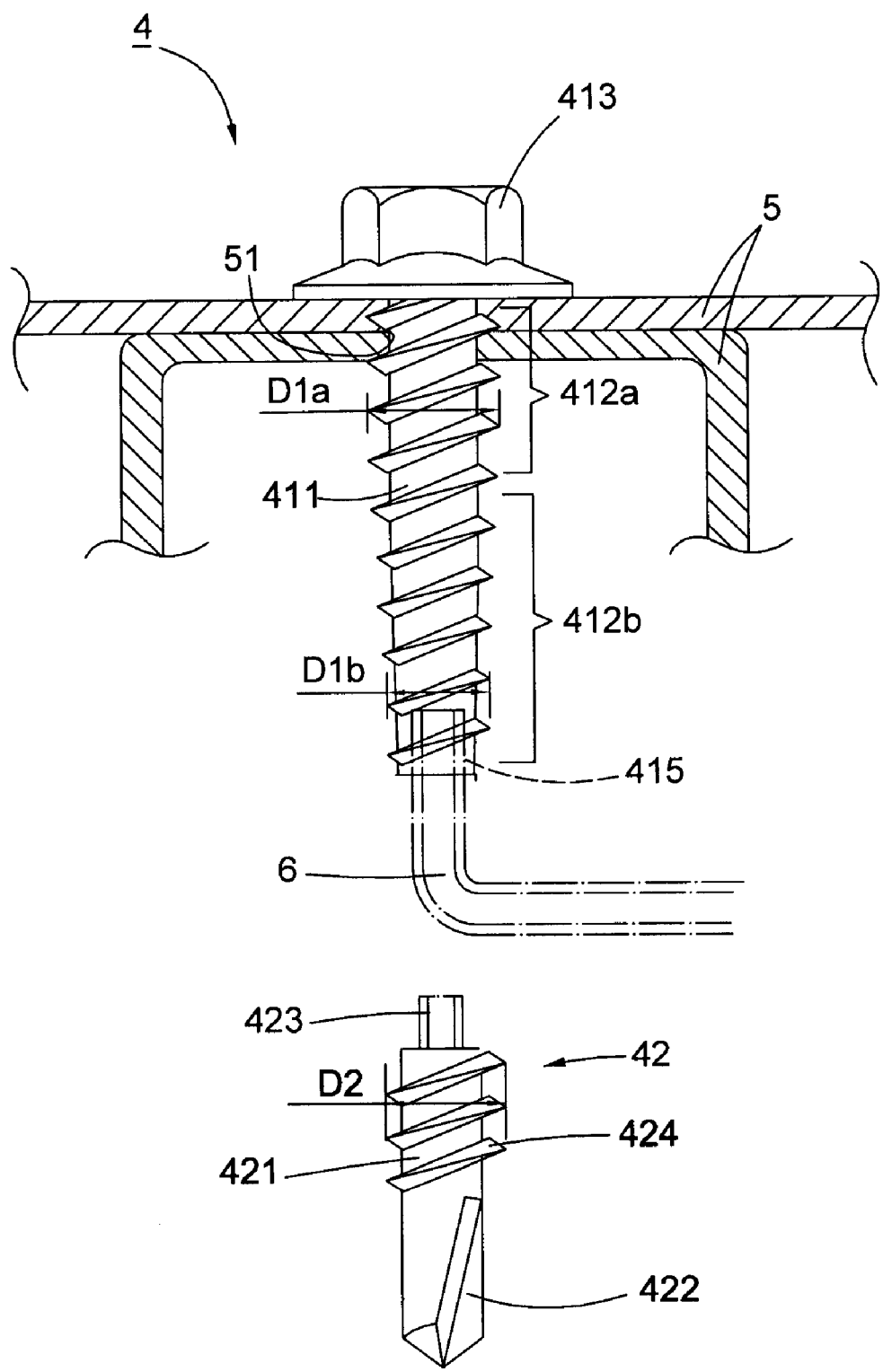
FIG. 7 is a schematic view showing the screw of the first preferred embodiment in time of screwing into the metal objects.

Referring to FIG. 7, in operation, the screw 4 can function as screwing roofing panels, for instance of screwing metal objects 5. Before screwing, the insertion 423 is initially put into the recess 415, and the drilling portion 422 is drilled into the objects 5 by rotating the head 413. Subsequently, the outer diameter "D2" of the second threaded section 424 assists in enlarging the drilling track and forms a hole 51 therethrough. When the tip section 42 is entirely drilled therein, the shank body 411 is further gradually guided along the track of the hole 51 into the objects 5 from the lower threaded section 412b with the smaller outer diameter "D1b" toward the upper threaded section 412a, so as to prevent the screw 4 from being directly interfered or blocked between the shank body 411 and the tip body 421 in time of screwing. Thus, the larger outer diameter "D1a" impels the screw 4 to be firmly held by the objects 5 after the shank body 411 is wholly drilled therein. Subsequently, the tip section 42 can be alternatively removed from the recess 415 for a repeated use if necessary and can perform in another use, namely users can work inside the house and exert a wrench 6 to insert into the recess 415 either for loosening or tightening the screw 4 from the objects 5. Users thus can freely adjust the screw 4 for renewing the objects without climbing on the roof, and which increases the convenience.

To sum up, the present invention takes advantage of the shank having a first threaded section with different outer diameters and the tip section which may also include a second threaded section spiraling thereon. In use, the shank can be smoothly driven into the objects along the screwing track by the above threaded sections, so that the screw is substantially drilled into the objects without impediment and fixed therein without swing and breaking the first threaded section, thus retaining a good screwing stability. After screwing, a wrench can be used instead of the tip section to insert into the recess for loosing or tightening the screw, thereby increasing the convenience of using.

While we have shown and described the embodiment in accordance with the present invention, it should be clear to those skilled in the art that further embodiments may be made without departing from the scope of the present invention.

We claim:

1. A screw with removable element comprising:
   a shank having a shank body, a first threaded section helically disposed on said shank body, a head disposed at one end of said shank body, and an end face disposed at the other end thereof opposite to said head, said end face having a recess defined therein; and
   a tip section having a tip body, a drilling portion disposed at one end of said tip body, and an insertion coaxially extending from the other end thereof to be inserted into said recess to abut said shank on said tip section;
   wherein, said first threaded section having an upper threaded section located adjacent to said head and a lower threaded section located adjacent to said end face; said tip section further having a second threaded section spiraled round said tip body and disposed between said drilling portion and said insertion, said threaded sections having the same pitches and respectively having outer diameters, said outer diameter of said upper threaded section being greater than said outer diameter of said second threaded section, and said outer diameter of said second threaded section being greater than said outer diameter of said lower threaded section.

2. The screw as claimed in claim 1, wherein said recess on said shank body and said insertion of said tip body are respectively formed in polygonal contours, whereby said insertion can be formed complementary to said recess.

3. A screw with removable element comprising:
   a shank having a shank body, a first threaded section helically disposed on said shank body, a head disposed at one end of said shank body, and an end face disposed at the other end thereof opposite to said head, said end face having a recess defined therein; and
   a tip section having a tip body, a drilling portion disposed at one end of said tip body, and an insertion coaxially extending from the other end thereof to be inserted into said recess to abut said shank on said tip section;
   wherein, said first threaded section having an upper threaded section located adjacent to said head and a lower threaded section located adjacent to said end face; said tip section further having a second threaded section spiraled round said tip body and disposed between said drilling portion and said insertion, said threaded sections having the same pitches and respectively having outer diameters, said outer diameter of said upper threaded section being greater than said outer diameter of said lower threaded section, and said outer diameter of said lower threaded section being greater than said outer diameter of said second threaded section.

4. The screw as claimed in claim 3, wherein said recess on said shank body and said insertion of said tip body are respectively formed in polygonal contours, whereby said insertion can be formed complementary to said recess.

* * * * *